United States Patent
Parrish et al.

(10) Patent No.: US 12,050,444 B2
(45) Date of Patent: Jul. 30, 2024

(54) GAS PHASE POLYMERIZATION PROCESS CONTROL USING PROJECTED DISTURBANCE VARIABLES AND NONLINEAR DYNAMIC MODELS

(71) Applicant: Dow Global Technologies LLC, Midland, MI (US)

(72) Inventors: John Roberts Parrish, Charleston, WV (US); Donald Alexander Morrow, Jr., South Charleston, WV (US); Mark Louis Nelson, South Charleston, WV (US)

(73) Assignee: Dow Global Technologies LLC, Midland, MI (US)

(*) Notice: Subject to any disclaimer, the term of this patent is extended or adjusted under 35 U.S.C. 154(b) by 412 days.

(21) Appl. No.: 17/421,454

(22) PCT Filed: Jan. 29, 2020

(86) PCT No.: PCT/US2020/015563
§ 371 (c)(1),
(2) Date: Jul. 8, 2021

(87) PCT Pub. No.: WO2020/160078
PCT Pub. Date: Aug. 6, 2020

(65) Prior Publication Data
US 2022/0083013 A1    Mar. 17, 2022

Related U.S. Application Data

(60) Provisional application No. 62/799,367, filed on Jan. 31, 2019.

(51) Int. Cl.
G05B 13/04    (2006.01)
G05B 11/32    (2006.01)
G05B 17/02    (2006.01)

(52) U.S. Cl.
CPC ........... G05B 13/041 (2013.01); G05B 11/32 (2013.01); G05B 17/02 (2013.01)

(58) Field of Classification Search
CPC ...... G05B 11/32; G05B 13/041; G05B 17/02; C08F 2/34; C08F 210/16
See application file for complete search history.

(56) References Cited

U.S. PATENT DOCUMENTS 5,191,521 A    3/1993  Brosilow
5,682,309 A *  10/1997 Bartusiak ............. G05B 13/048
                                                     700/44

(Continued)

FOREIGN PATENT DOCUMENTS

CN    101477112 A    7/2009
CN    102736570 A    10/2012

(Continued)

OTHER PUBLICATIONS

International Search Report & Written Opinion for related PCT Application PCT/US2020/015563, mailed May 14, 2020 (15 pgs).

(Continued)

Primary Examiner — M. N. Von Buhr
(74) Attorney, Agent, or Firm — Brooks, Cameron & Huebsch, PLLC (57) ABSTRACT

Coordinated control systems and methods of controlling an actual process are provided. The coordinated control systems and methods of controlling an actual process utilize a nonlinear dynamic model, where measured disturbing variables are incorporated into the nonlinear dynamic model, and predictive controller calculations.

8 Claims, 6 Drawing Sheets

(56) References Cited

U.S. PATENT DOCUMENTS

| | | | |
|---|---|---|---|
| 6,122,557 A | 9/2000 | Harrell et al. | |
| 6,144,897 A | 11/2000 | Selliers | |
| 7,039,475 B2 * | 5/2006 | Sayyarrodsari | G05B 13/027 |
| | | | 700/47 |
| 7,330,804 B2 | 2/2008 | Turner et al. | |
| 8,742,035 B2 | 6/2014 | Samples et al. | |
| 2004/0063871 A1 | 4/2004 | Parrish et al. | |
| 2007/0198104 A1 * | 8/2007 | Sayyarrodsari | G05B 13/042 |
| | | | 700/44 |
| 2009/0319059 A1 | 12/2009 | Renfro et al. | |
| 2010/0144967 A1 | 6/2010 | Parrish et al. | |
| 2010/0152900 A1 * | 6/2010 | Gurciullo | C01B 3/384 |
| | | | 700/272 |
| 2011/0269921 A1 | 11/2011 | Mileo et al. | |
| 2013/0123440 A1 | 5/2013 | Samples et al. | |

FOREIGN PATENT DOCUMENTS

| | | |
|---|---|---|
| EP | 2738211 A1 | 6/2014 |
| WO | 02075325 A1 | 9/2002 |

OTHER PUBLICATIONS

Shafiee, et al., "Non-Linear Predictive Control of a Polymerization Reactor Based on Piecewise Linear Wiener Model"; Chemical Engineering Journal, vol. 143, No. 1-3, Sep. 15, 2008 (12 pgs).
International Preliminary Report on Patentability for related PCT Application PCT/US2020/015563, mailed Aug. 12, 2021 (9 pgs).

* cited by examiner

GAS PHASE POLYMERIZATION PROCESS CONTROL USING PROJECTED DISTURBANCE VARIABLES AND NONLINEAR DYNAMIC MODELS

This application is a National Stage Application under 35 U.S.C. § 371 of International Application Number PCT/US2020/015563, filed Jan. 29, 2020 and published as WO 2020/160078 A1 on Aug. 6, 2020, which claims the benefit to U.S. Provisional Application 62/799,367, filed Jan. 31, 2019, the entire contents of which are incorporated herein by reference in its entirety

FIELD OF DISCLOSURE

The present disclosure relates generally to process control. More specifically, but without limitation, the disclosure relates to coordinated control systems and methods of controlling an actual process.

BACKGROUND

A number of systems and methods are utilized to control various processes, such as industrial processes. Process control may be utilized to satisfy an objective, such as predictability, stability, and/or operating at a desired level. There is continued focus in the industry to providing new and improved control systems and/or methods of controlling a process.

SUMMARY

The present disclosure provides a method of controlling an actual process, the method comprising: determining a set of projection values for a measured disturbing variable wherein the measured disturbing variable is not actively manipulated to influence an actual primary control variable; determining an actual primary control variable value for the actual primary control variable; determining an estimate of the actual primary control variable value utilizing a first nonlinear dynamic model, wherein the first nonlinear dynamic model utilizes a primary manipulated variable value, a secondary manipulated variable value, and the set of projection values for the measured disturbing variable; determining a primary manipulated variable set point value utilizing a second nonlinear dynamic model, the actual primary control variable value, the estimate of the actual primary control variable value, an actual primary control variable set point value, and the set of projection values for the measured disturbing variable, wherein the primary manipulated variable set point value is utilized to meet a control objective; determining a secondary manipulated variable set point value utilizing a third nonlinear dynamic model, the actual primary control variable value, the estimate of the actual primary control variable value, the determined actual primary control variable value, and the set of projection values for the measured disturbing variable, wherein the secondary manipulated variable set point value is utilized to meet the control objective; and providing the primary manipulated variable set point value and the secondary manipulated variable set point value to the actual process, thereby controlling the actual process.

The present disclosure provides a non-transitory computer-readable medium storing instructions executable by a processing resource to implement methods of controlling an actual process, as disclosed herein.

The present disclosure provides a coordinated control system comprising: an actual process associated with an actual primary control variable; a primary controller that controls a primary manipulated variable that influences the actual primary control variable, wherein the primary controller provides a primary manipulated variable set point value to the actual process; a secondary controller that controls a secondary manipulated variable that influences the actual primary control variable, wherein the secondary controller provides a secondary manipulated variable set point value to the actual process; an estimate of process that utilizes a nonlinear dynamic model to determine an estimated primary control variable value, wherein the nonlinear dynamic model utilizes the primary manipulated variable value, the secondary manipulated variable value, and a measured disturbing variable value; and a projection of the measured disturbing variable that provides a set of projection values for the measured disturbing variable to the primary controller and the secondary controller, wherein: the primary controller determines a primary manipulated variable set point value to be presently effectuated; the primary manipulated variable set point value is utilized to meet a control objective; and the secondary controller determines a secondary manipulated variable set point value to be presently effectuated.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

The present disclosure provides coordinated control systems and methods of controlling an actual process. The disclosed coordinated control systems and methods of controlling an actual process may provide improved responsiveness, as compared to other control systems and/or control methods. The improved responsiveness can help provide a number of desirable benefits, such as reduced variability allowing the process to run closer to process limits that may result in increased process production, among other desirable benefits. Advantageously, the disclosed coordinated control systems and methods of controlling an actual process utilize a nonlinear dynamic model, where measured disturbing variables are incorporated into the nonlinear dynamic model, and predictive controller calculations.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits.

Figure 1:
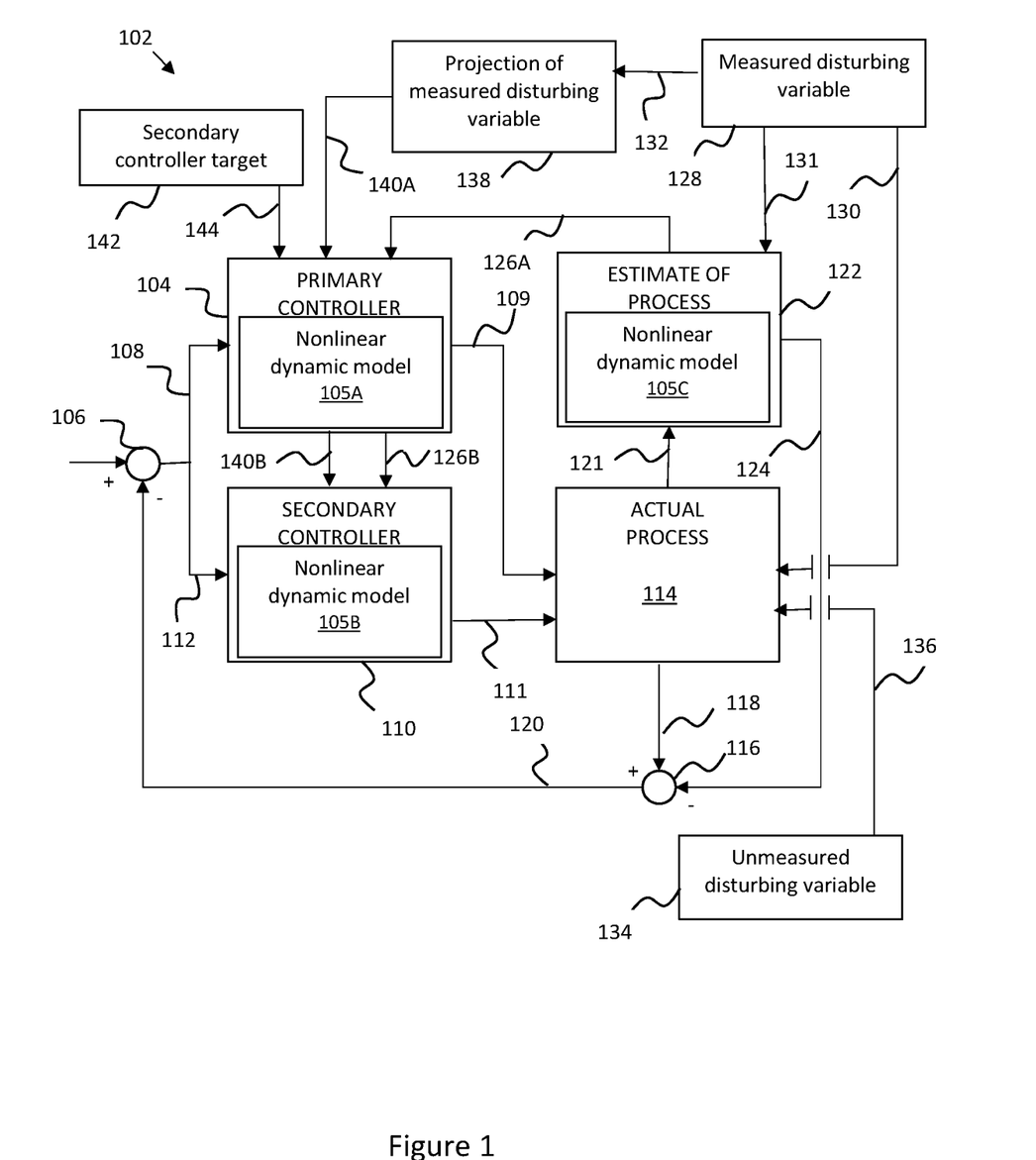
FIG. 1 is an illustration of an example of a coordinated control system in accordance with one or more embodiments of the present disclosure.

FIG. 1 is an illustration of an example of a coordinated control system 102 in accordance with one or more embodiments of the present disclosure. The coordinated control system 102 illustrates the relationships of various signals associated with the coordinated control system 102. The coordinated control system 102 may be utilized with the methods of controlling a process, as disclosed herein. Control systems having two or more interconnected model-based controllers may be referred to as coordinated control systems, as disclosed herein. Each of the two or more interconnected controllers may be utilized to control a respective manipulated variable, and may utilize target values for those respective manipulated variables. In one embodiment of a coordinated control system disclosed herein, a first controller can move a manipulated variable from a base value to a different value in order to achieve a control objective, where an additional controller can temporarily move a respective manipulated variable away from a target value to achieve the control objective more quickly than could be achieved by the first controller by itself, and then eventually return to the target value.

The coordinated control system 102 includes a primary controller 104. The primary controller 104 may be utilized to determine, e.g., calculate, a primary manipulated variable set point value.

A primary manipulated variable is a manipulated variable that can influence, e.g., change a value of, an actual primary control variable. For instance, adjusting a primary manipulated variable set point value can help to move the actual primary control variable to a desired value.

The primary manipulated variable may be referred to as a slow acting variable. As used herein, a "slow acting variable" has a greater dead time and/or a greater lag response as compared to other manipulated variables, which may be referred to as "fast acting variables". In this context, "dead time" refers to a pure time delay, e.g., a length of time after the primary manipulated variable has been moved before the actual primary control variable moves in response. In this context, "lag response" refers to how quickly the primary control variable moves from the initial value to the final value independently of the dead time, where a greater lag response indicates that the movement from an initial value to a final value is relatively slower as compared to a lesser lag response. Different manipulated variables may be slow acting variables for various applications. As an example, catalyst flow rate and catalyst composition may be considered slow acting variables for a number of gas phase polymerization applications.

The primary controller 104 may receive an input signal 108 from a comparator 106. The comparator 106 may compare a primary control variable value to a primary control variable set point value, providing a difference as the comparator output. For instance, comparator 106 may provide a desired value for the actual primary control variable to the primary controller 104. The primary control variable set point, e.g., the desired value for the actual primary control variable, may be a constant value or may be a dynamic value. The primary controller 104 may provide a signal 109, e.g. a primary manipulated variable set point value, as discussed further herein. One or more embodiments provide that the primary manipulated variable set point value may be provided to a lower level closed loop or open loop controller, including providing the primary manipulated variable set point value directly to a process actuating device, such as a valve, among others. The primary controller 104 may utilize a nonlinear dynamic model 105A, as discussed further herein.

The coordinated control system 102 includes a secondary controller 110. The secondary controller 110 may be utilized to determine, e.g., calculate a secondary manipulated variable value.

A secondary manipulated variable is a manipulated variable that can influence the actual primary control variable. For instance, adjusting the secondary manipulated variable set point value can help to move the actual primary control variable to a desired value.

The secondary manipulated variable may be referred to as a fast acting variable. As used herein, a "fast acting variable" has a lesser dead time and/or a lesser lag response as compared to other manipulated variables, e.g., slow acting variables as discussed herein. Different manipulated variables may be fast acting variables for various applications. As an example, a weight of a fluidized bed, a catalyst concentration, a concentration of one or more monomers, a flow rate of one or more comonomers, a ratio of a first comonomer to a second comonomer, a first activator concentration, a ratio of a second activator to selectivity control agent, a concentration of a chain transfer agent, ethylene partial pressure, oxygen to ethylene flow ratio, and a retardant concentration, may be considered fast acting variables for a number of gas phase polymerization applications.

The secondary controller 110 may receive an input signal 112 from a comparator 106. For instance, comparator 106 may provide a desired value for the actual primary control variable to the secondary controller 110. The secondary controller 110 may provide a signal 111, e.g., a secondary manipulated variable set point value, as discussed further herein. The secondary controller 110 may utilize a nonlinear dynamic model 105B, as discussed further herein.

The coordinated control system 102 includes an actual process 114. The actual process 114 is a process that may be controlled utilizing the coordinated control system 102 and/or the methods of controlling a process, as disclosed herein. The actual process 114 may be a physical system. The actual process 114 can include an industrial process, e.g., a gas phase polymerization reactor.

The actual process 114 may receive the signal 109, i.e. the primary manipulated variable set point value, from the primary controller 104. Upon receiving the signal 109, the actual process may adjust the primary manipulated variable set point value, e.g., from a value utilized prior to the receipt of signal 109 to the primary manipulated variable set point value associated with signal 109. The actual process 114 may receive the signal 111, i.e. the secondary manipulated variable set point value, from the secondary controller 110. Upon receiving the signal 111, the actual process may adjust the secondary manipulated variable set point value, e.g., from a value utilized prior to the receipt of signal 111 to the secondary manipulated variable set point value associated with signal 111.

Measurements, to be utilized for control, may be taken from the actual process 114. A number of measurements may be taken from the actual process 114 to determine an actual primary control variable value. The actual process 114 may be utilized to determine an actual primary control variable value, e.g., the actual process 114 is associated with the actual primary control variable. Additionally, the actual process 114 may be utilized to infer, e.g., by utilizing secondary measurements, an actual primary control variable value. The actual primary control variable value can be determined, e.g., measured and/or inferred, and be provided to comparator 116 by signal 118. Signal 120 may be a difference output. Signal 120 may be provided from comparator 116 to comparator 106. Signal 121 may provide a number of values, such as one or more actual process measurement values and/or other information associated with the actual process 114, to an estimate of process, as discussed further herein.

Different actual primary control variables may be utilized for various applications. An example of the actual primary control variable, e.g., when the actual process is a gas phase polymerization, is polymer production rate.

The coordinated control system 102 includes an estimate of process 122. The estimate of process 122 may be utilized to determine an estimated primary control variable value. The estimated primary control variable value may be determined in real time. Determination of the estimated primary control variable value may utilize the nonlinear dynamic model 105C. Determination of the estimated primary control variable value may utilize information from measured disturbing variable 128 and one or more measurements taken from the actual process 114.

The estimate of process 122 may output an estimated primary control variable value. The estimated primary control variable value can be considered to be a modeled estimate of the actual primary control variable value. The estimated primary control variable value may be provided from the estimate of process 122 to comparator 116 by signal 124. The estimated primary control variable value may be provided from the estimate of process 122 to the primary controller 104 by signal 126A and to the secondary controller 110 by signal 126B. Signal 126A and signal 126B may provide a number of values, such as one or more actual process measurement values and/or other information associated with the actual process 114 and/or information associated with the estimate of process 122 respectively to the primary controller 104 and/or the secondary controller 110.

The coordinated control system 102 includes a measured disturbing variable 128. The measured disturbing variable 128 is a measured variable that influences the actual primary control variable value, e.g., a change to a measured disturbing variable value may result in a change to the actual primary control variable value. However, the measured disturbing variable 128 is not actively manipulated to influence the actual primary control variable value. One or more embodiments provide that the measured disturbing variable 128 is an uncontrolled variable. One or more embodiments provide that the measured disturbing variable 128 is not controlled by either the primary controller 104 or the secondary controller 110. Various numbers of measured disturbing variables may be utilized for different applications. Different measured disturbing variables may be utilized for various applications. An example of the measured disturbing variable 128, e.g., when the actual process is a gas phase polymerization, is a molar gas ratio of hydrogen-to-ethylene.

A measured disturbing variable value may be provided from the measured disturbing variable 128 to the actual process 114 by signal 130. The measured disturbing variable value may be provided from the measured disturbing variable 128 to a projection of measured disturbing variable 138, as discussed further herein, by signal 132. The measured disturbing variable value may be provided from the measured disturbing variable 128 to the estimate of process 122 by signal 131.

The coordinated control system 102 includes an unmeasured disturbing variable 134. The unmeasured disturbing variable 134 is an unmeasured variable that may influence the actual primary control variable value; however, the unmeasured disturbing variable 134 is not actively manipulated to influence the actual primary control variable value. Various numbers of unmeasured disturbing variables may be utilized for different applications. Different unmeasured disturbing variables may be utilized for various applications. Examples of the unmeasured disturbing variable 134, e.g., when the actual process is a gas phase polymerization, is an impurity introduced into the gas phase polymerization feed stream.

Embodiments of the present disclosure provide that a difference between the estimated primary control variable value and the actual primary control variable value is attributable to the unmeasured disturbing variable 134. An unmeasured disturbing variable value may be provided from the unmeasured disturbing variable 134 to the actual process 114 by signal 136.

The coordinated control system 102 includes a set of projection values associated with measured disturbing variable 138, e.g., a set of estimated and/or expected values for the measured disturbing variable at a future time. The set of projection values for the measured disturbing variable can include values for various future times. The set of projection values for the measured disturbing variable can include a continuous or discrete time stream of values. The set of projection values for the measured disturbing variable can include an array. The array may be an array of values beginning at a current time and incremented forward in time by a chosen sample period. The set of projection values can be updated as time proceeds.

The projection of measured disturbing variable 138 projects, e.g., estimates, the set of projection values for the measured disturbing variable for future times for respective utilization by the primary controller 104 and the secondary controller 110. For example, the projection of measured disturbing variable 138 can include future times that are beyond current time by the dead time of the primary manipulated variable because a change to the primary manipulated variable not will begin to not impact the primary control variable until that dead time has passed. The projection of measured disturbing variable 138 helps provide that primary controller 104 and/or the secondary controller 110 can advantageously anticipate process and disturbance dynamics. Determining the set of projection values of measured disturbing variable can include: determining a future set point, which may be provided by a separate controller to achieve a separate control objective; determining if a constraint, such as a ramp rate or clamp, will be applied; and predicting how the measured disturbing variable will approach the set point over time, e.g., by using a separate model based on historical data and/or a model using engineering principles, for instance. The set of projection values of the measured disturbance variable may be provided from the projection of measured disturbing variable 138 to the primary controller 104 by signal 140A and to the secondary controller 110 by signal 140B.

The coordinated control system 102 includes a secondary controller target 142. The secondary controller target 142 can provide a secondary controller target value to the primary controller 104 by signal 144. The secondary manipulate variable set point value can move around the secondary controller target value such that the secondary manipulated variable moves to satisfy a control objective faster than only adjusting the primary manipulated variable would satisfy the control objective. The secondary controller target 142 may be stationary or may move over time, e.g. based upon an objective such as a process objective and/or economic objective.

As mentioned, embodiments of the present disclosure provide methods of controlling an actual process that may utilize the coordinated control system as discussed herein. The methods of controlling an actual process disclosed herein can advantageously provide improved control that can help reduce a variable's deviation from a set point, for instance.

Methods of controlling an actual process can include coordinately manipulating two or more process variables, i.e. the primary manipulated variable and the secondary manipulated variable. Coordinately manipulating the two or more process variables includes, as mentioned, utilizing nonlinear dynamic models, where measured disturbing variables are incorporated into the nonlinear dynamic models, and predictive controller calculations. The primary controller and the secondary controller may be utilized to coordinately control the primary manipulated variable and the secondary manipulated variable.

Methods of controlling an actual process can include determining an actual primary control variable value. Determining the actual primary control variable value can include measuring, e.g., directly measuring a value from the actual process, and/or inferring, e.g., utilizing secondary measurements associated with the actual process.

An estimated primary control variable value can be determined. A nonlinear dynamic model associated with the estimate of process may utilize past and/or present values determined from the actual process, a primary manipulated variable value, a secondary manipulated variable value, and a measured disturbing variable value to determine the estimated primary control variable value. As understood by those skilled in the art, the nonlinear dynamic model associated with the estimate of process may also utilize additional information. The estimated primary control variable value may be the same or different than the actual primary control variable value. The estimated primary control variable value may be different than the actual primary control variable value due to an influence of one or more unmeasured disturbing variables to the actual process. However, the disclosed coordinated control systems and methods of controlling a process may advantageously provide improved control performance in light of modeling error and/or unmeasured disturbances, as compared to other control systems and methods of control.

Embodiments of the present disclosure provide that the primary controller and the secondary controller may determine respective control actions, e.g., respective set point values. These respective control actions are utilized to achieve a future control objective, such as a desired polymer production rate among others, rather than at the time control calculations are being performed. The controllers determine future control objectives due to dead times and/or lag responses associated with the actual process, such as gas phase polymerization. Therefore, the projection of measured disturbing variable is utilized to provide future values, i.e. projected values, of the measured disturbing variable to the primary controller and the secondary controller.

The projection of measured disturbing variable can include estimating a future set point of the measured disturbing variable. As mentioned, the measured disturbing variable is not actively manipulated to influence the actual primary control variable value; however, the measured disturbing variable may be actively manipulated to influence other control variables and/or control objectives. As such, a future set point of the measured disturbing variable is available to the primary controller and the secondary controller.

The projection of measured disturbing variable can include determining if a constraint, such as a ramp rate or clamp, will be applied and applying the determined constraint to the projection of measured disturbing variable. Applying the determined constraint to the projection of measured disturbing variable can influence the future set point of the measured disturbing variable. The projection of measured disturbing variable can include modeling of how the measured disturbing variable responds to a change in the set point, if any, of the measured disturbing variable at both a primary controller future time and a secondary controller future time.

Methods of controlling an actual process can include determining an effective value of unmeasured disturbances and modeling error. The effective value of unmeasured disturbances and modeling error may be determined as a difference between an estimated primary control variable value and an actual primary control variable value. The effective value may be considered to be an effective bias, which may be referred to as offset, between the model and the actual process. The effective value indicates an influence that the unmeasured disturbing variable had on the actual process, and also encompasses any modeling error in the nonlinear dynamic model.

Methods of controlling an actual process can include determining a difference between the effective value of unmeasured disturbances and modeling error and a primary control variable set point value. The difference between the effective value of unmeasured disturbances and modeling error and a primary control variable set point value may be sent to the primary controller and the secondary controller for utilization by the respective nonlinear dynamic models.

The primary controller can determine a primary manipulated variable set point value, to be presently effectuated, where the primary manipulated variable set point value is utilized to meet a control objective at a future time as selected for the primary controller. The future time selected for the primary controller can be referred to as a time horizon, e.g., a primary controller time horizon. To determine this primary manipulated variable set point value, the primary controller determines how far the controller will move from the primary control variable set point value used by the primary controller in a previous iteration to the set point value determined in the previous step. This determination may be referred to as a primary controller trajectory.

The primary controller trajectory may be determined by utilizing a specified tuning constant. Varying the specified tuning constant may influence how aggressively the primary controller responds. For a number of applications, it is desirable to make the controller more aggressive or less aggressive by varying the specified tuning constant.

The primary controller can utilize the primary controller trajectory, the set of projection values for the measured disturbing variable at the future time, the secondary controller target value, and optionally actual process measurements and invert the nonlinear dynamic model to determine the primary manipulated variable set point value for achieving the control objective, including achieving the secondary controller target value. As appreciated by those skilled in the art, non-invertible portions of the nonlinear dynamic model, such as dead time, are not inverted.

Methods of controlling an actual process can include determining a secondary manipulated variable set point value. The secondary controller can determine a secondary manipulated variable set point value to be presently effectuated. To determine this secondary manipulated variable set point value, the secondary controller determines how far the controller will move the primary control variable set point value used by the secondary controller used in the previous iteration to the set point determined in the previous step. This determination may be referred to as a secondary controller trajectory. The secondary controller trajectory may be determined by utilizing a specified tuning constant.

The secondary controller can utilize the secondary controller trajectory, the set of projection values for the measured disturbing variable at a future time, and optionally actual process measurements and invert the nonlinear dynamic model to determine the secondary manipulated variable set point value for achieving the control objective. As appreciated by those skilled in the art, non-invertible portions of the nonlinear dynamic model, such as dead time, are not inverted.

Methods of controlling a process can include adjusting the primary manipulated variable set point value and the secondary manipulated variable set point value in view of any constraints, such as a ramp rate or clamp.

The primary manipulated variable set point value and the secondary manipulated variable set point value can be provided to the actual process, thereby controlling the actual process. Steps of the methods of controlling an actual process may then be repeated.

As mentioned, the coordinated control systems and methods of controlling an actual process utilize a nonlinear dynamic model, e.g., as discussed above nonlinear dynamic model 150A, 150B, and 150C may be utilized. One or more embodiments provide that nonlinear dynamic model 150A, nonlinear dynamic model 150B, and nonlinear dynamic model 150C are the same model. One or more embodiments provide that nonlinear dynamic model 150A, nonlinear dynamic model 150B, and nonlinear dynamic model 150C are different models. One or more embodiments provide that nonlinear dynamic model 150A, nonlinear dynamic model 150B, and nonlinear dynamic model 150C are independently selected from a same model, a different model, or a combination thereof. As appreciated by those skilled in the art, some nonlinear dynamic models may utilize different inputs and/or provide different outputs relative to one another, e.g., due to utilization at different components of the coordinated control system. Advantageously, the nonlinear dynamic model may quantitatively relate model inputs, such as those associated with the primary manipulated variable, the secondary manipulated variable, the measured disturbing variable, and the actual process. The model output may be a process variable, such as the primary control variable.

Because the nonlinear dynamic model is a dynamic model, it can include time as an input and is able to determine the model output across a time horizon. As discussed herein, the nonlinear dynamic model is utilized with various coordinated control system components, e.g., the primary controller, the secondary controller, and the estimate of process and is utilized in a number of steps of the method of controlling a process. The nonlinear dynamic model does not require a specific model or model form. However, the nonlinear dynamic model is both nonlinear and dynamic. Embodiments of the present disclosure provide that nonlinear portions of the nonlinear dynamic model, i.e. invertible portions, are continuous and monotonic across the applicable operating region.

One or more embodiments of the present disclosure provide that the nonlinear dynamic model may be represented by the following Formula I:

$$PV = f_{NL}(PMV, SMV, MDV, APM, OTR, Time) \quad \text{Formula I}$$

where
PV=Process Variable (such as Primary Control Variable) (model output);
$f_{NL}$=Nonlinear Function;
PMV=Primary Manipulated Variables (model input);
SMV=Secondary Manipulated Variables (model input);
MDV=Measured Disturbing Variables (model input);
APM=Actual Process Measurements or inferences (model input);
OTR=Other information required for calculation (model input);
Time=Time (model input).

One or more embodiments of the present disclosure provide that the nonlinear dynamic model, which has a nonlinear function that is independent of time, may be represented by the following Formula II:

$$PV = f_{NL}(PMV, SMV, MDV, APM, OTR) \quad \text{Formula II}$$

where
PV=Process Variable Value (such as Primary Control Variable) (model output);
$f_{NL}$=Nonlinear Function;
PMV=Primary Manipulated Variable Value (model input);
SMV=Secondary Manipulated Variable Value (model input);
MDV=Measured Disturbing Variable Value (model input);
APM=Actual Process Measurements or inferences (model input);
OTR=Other information utilized for calculation (model input).

Dynamics in the nonlinear dynamic model are provided by dynamic linear model elements applied to inputs to the nonlinear dynamic model. In other words, raw nonlinear dynamic model inputs may be processed with dynamic linear model elements to provide dynamic model inputs. The dynamic model inputs may be utilized in conjunction with nonlinear portions of the model to provide a dynamic model output. The nonlinear dynamic model may be referred to as a Hammerstein-Wiener model. Hammerstein-Wiener models are discussed in the publication: Wills, Adrian & SchÖn, Thomas & Ljung, Lennart & Ninness, Brett. (2013). Identification of Hammerstein-Wiener Models. Automatica. 49. 70-81. 10.1016/j.automatica.2012.09.018, for instance.

The nonlinear dynamic model may comprise dynamic linear model elements including linear differential/difference equations, where the nonlinear model element comprises algebraic relationships. One or more embodiments of the present disclosure provide that the dynamic linear model elements include a dead time (DT or D) and first order time constant (T).

Figure 2:
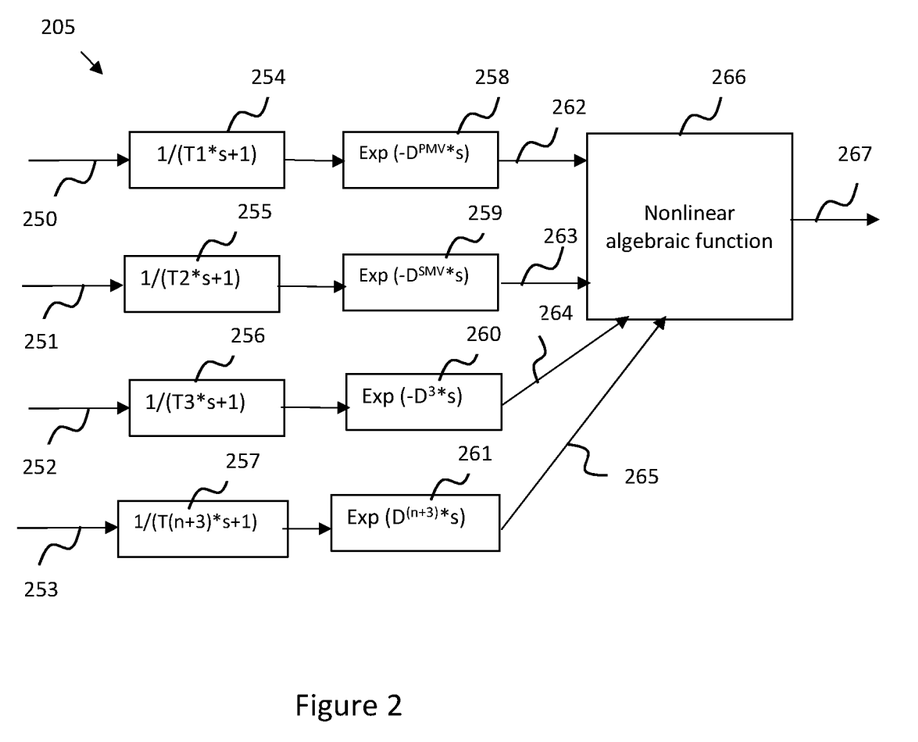
FIG. 2 is an illustration of an example of a nonlinear dynamic model in accordance with one or more embodiments of the present disclosure.

FIG. 2 is an illustration of an example of a nonlinear dynamic model 205 in accordance with one or more embodiments of the present disclosure. The nonlinear dynamic model 205 utilizes Laplace Operator notation, and, for purposes of illustration, includes two manipulated variables and a single primary control variable.

The nonlinear dynamic model 205 may have a number of inputs. As shown in FIG. 2, the nonlinear dynamic model 205 includes input 250, input 251, input 252, and input 253. For the example of the nonlinear dynamic model 205 shown in FIG. 2: input 250 corresponds to a primary manipulated variable value; input 251 corresponds to a secondary manipulated variable value; input 252 corresponds to a first measured disturbing variable value; and input 253 corresponds to a $n^{th}$ measured disturbing variable value, where n is an integer greater than one and the nonlinear dynamic model 205 includes n measured disturbing variable value inputs.

As shown in FIG. 2, the inputs 250, 251, 252, 253 are received respectively by dynamic linear model elements 254, 255, 256, 257. As shown in FIG. 2, the nonlinear dynamic model 205 further includes dynamic linear model elements 258, 259, 260, 261. "T" is utilized to represent a first order time constant and "D" is utilized to represent dead time.

Dynamic linear model element outputs 262, 263, 264, 265 can be received by nonlinear element 266. As mentioned, the nonlinear model element 266 comprises algebraic relationships, e.g., a nonlinear algebraic function.

The nonlinear dynamic model 205 can provide a nonlinear dynamic model output 267. The nonlinear dynamic model output 267 can correspond to a primary control variable value.

An example of the nonlinear model element 266 is shown by the following Formula III:

$$PR = 0.0121 * \frac{CF^{1.31} * C_2PP^{1.58} * \left(\frac{C_4}{C_2} - 0.12\right)^{0.35} * \left(\frac{C_6}{C_2} - 0.055\right)^{0.42}}{\left(\frac{H_2}{C_2} - 0.91\right)^{1.66}} \quad \text{Formula III}$$

where:
PR=Production Rate (kg/h);
CF=Catalyst Feed Rate (kg/h);
$C_2PP$=Ethylene Partial Pressure (kPa);
$C_4/C_2$=Butene-to-Ethylene Molar Ratio (mol/mol);
$C_6/C_2$=Hexene-to-Ethylene Molar Ratio (mol/mol);
$H_2/C_2$=Hydrogen-to-Ethylene Molar Ratio (mol/mol).

Formula III corresponds to a nonlinear dynamic model 205, where the actual process is a gas phase polymerization reactor and the nonlinear dynamic model output 267 output for the actual primary control is polymer production rate. The primary manipulated variable is catalyst feed rate and the secondary manipulated variable is ethylene partial pressure. Three measured disturbing variables, i.e. n is three as discussed above, are utilized: butene-to-ethylene molar ratio; hexene-to-ethylene molar ratio; and hydrogen-to-ethylene molar ratio. For Formula III, the applicable operating window is: catalyst feed rate is from 0 to 20 kg/hr; ethylene partial pressure from 500 to 1500 kPa; butene-to-ethylene molar ratio from 0.13 to 0.5 mol/mol; hexene-to-ethylene molar ratio from 0.06 to 0.3 mol/mol; and hydrogen-to-ethylene molar ratio from 0.92 to 1.50 mol/mol. The values are provided for illustration, and are not intended to limit embodiments of the disclosure.

A simulation was performed utilizing the disclosed coordinated control system and method of controlling an actual process. For the simulation, the process objective was to maintain the actual primary control variable, i.e. polymer (polyethylene) production rate, at a constant set point during a polymer grade transition. Formula III, as described above was utilized. For the initial polymerization reaction, the catalyst feed rate was 7.01 kg/hr, the ethylene partial pressure was 980 kPa, the butene-to-ethylene molar ratio was 0.4 mol/mol, the hexene-to-ethylene molar ratio was 0.2 mol/mol, and the hydrogen-to-ethylene molar ratio was 1.1 mol/mol. The polymer production rate was lined out and had a matching set point of 37 t/hr. For this simulation, it was desired to maintain the ethylene partial pressure within 50 kPa of a 980 kPa target.

At minute 20 the polymer grade transition began. The set point for the hexene-to-ethylene ratio (mol/mol) was decreased to 0.15 mol/mol, the set point for the hydrogen-to-ethylene ratio (mol/mol) was increased to 1.2 mol/mol, and the set point for the butene-to-ethylene ratio was maintained at 0.4 mol/mol.

Figure 3:
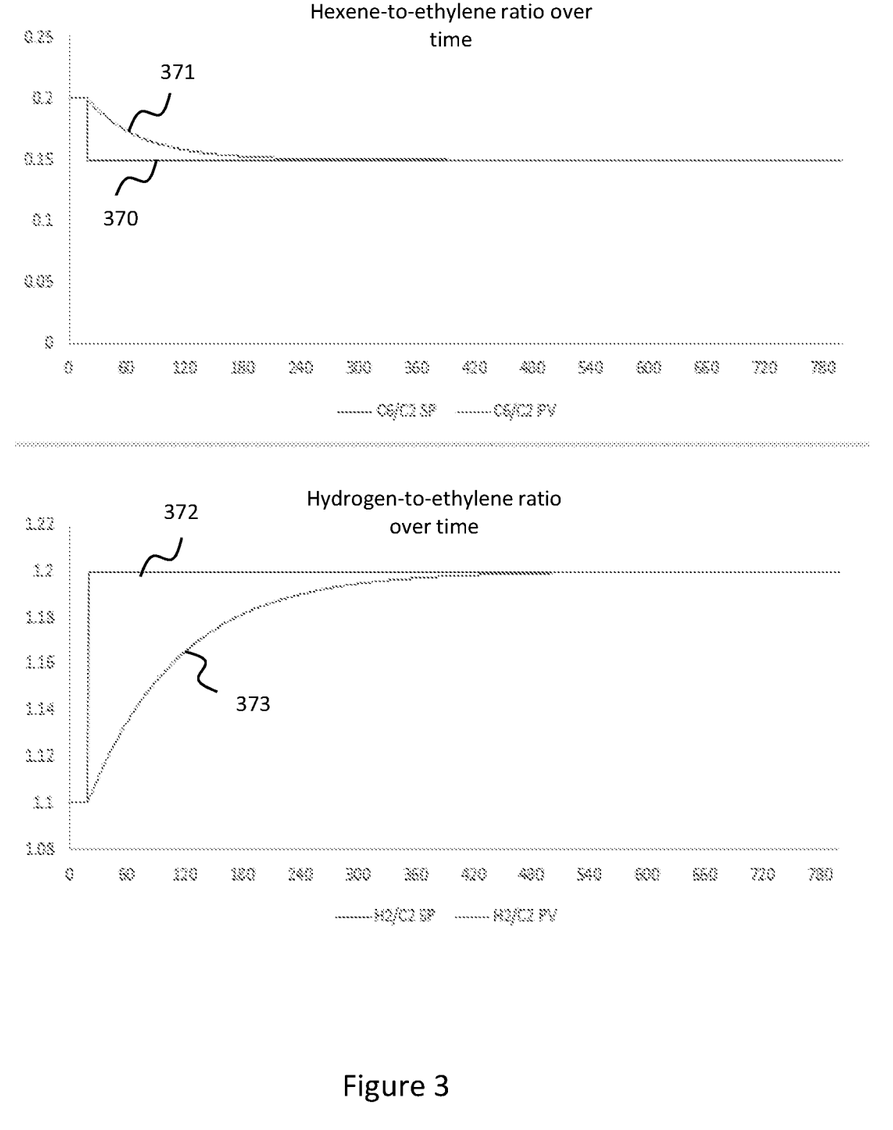
FIG. 3 illustrates a response of hexene-to-ethylene ratio and hydrogen-to-ethylene ratio in accordance with one or more embodiments.

FIG. 3 illustrates a response of hexene-to-ethylene ratio and hydrogen-to-ethylene ratio in accordance with one or more embodiments. Plotted data 370 illustrates set points for the hexene-to-ethylene ratio over time; plotted data 371 illustrates the hexene-to-ethylene ratio, i.e. the present value, in relation to the set point. Plotted data 372 illustrates set points for the hydrogen-to-ethylene ratio over time; plotted data 373 illustrates the hydrogen-to-ethylene ratio, i.e. the present value, in relation to the set point.

In the first minute following the grade transition starting, new set points were determined for the catalyst feed rate and the ethylene partial pressure to maintain the actual production rate as close as possible to the set point of 37 t/h. At this time, 1 minute into the transition at minute 21, the measured polymer production rate from the actual process, i.e. the actual production rate, was observed to be 36.32 t/hr.

An estimated primary control variable value, i.e. the estimated polymer production rate, was determined using the estimate of process. For this simulation, the estimate of process utilized Formula III, as discussed above.

For this simulation, the dynamic linear model elements applied to the model inputs include a first order filter, defined by first order time constant, and a dead time. The dynamic linear model elements transform raw values into dynamic values that are then applied to the nonlinear algebraic function represented by Formula III. The dynamic linear model element, known as a first-order lag, can be represented by the following Formula IV:

$$y_i(t) = \frac{x_i(t - D_i) * \Delta t + y_i(t - \Delta t) * \tau_i}{\Delta t + \tau_i} \quad \text{Formula IV}$$

where
$y_i(t)$=dynamic value for variable i after dynamics applied at time t;
$x_i(t-D_i)$=raw value for variable i at time t minus the dead time;
$y_i(t-\Delta t)$=dynamic model value for variable i from previous interval;

$D_i$=model dead time for variable i (min);
$\tau_i$=first-order time constant for variable i (min);
$\Delta t$=calculation interval (min).

Specific time constants and dead times are reported in Table 1.

TABLE 1

|  | Time Constant | Dead Time |
|---|---|---|
| Catalyst Feed Rate | 50.0 min | 20.0 min |
| Ethylene Partial Pressure | 10.0 min | 10.0 min |
| Butene-to-Ethylene Molar Ratio (mol/mol) | 0.0 min | 0.0 min |
| Hexene-to-Ethylene Molar Ratio (mol/mol) | 0.0 min | 0.0 min |
| Hydrogen-to-Ethylene Molar Ratio (mol/mol) | 0.0 min | 0.0 min |

An estimated polymer production rate value at minute 21 was calculated by first determining the inputs to the nonlinear dynamic model. At this time the hexene-to-ethylene ratio had decreased from 0.2 to 0.1991 mol/mol in response to the set point change; the hydrogen-to-ethylene ratio had increased from 1.1 to 1.1010 mol/mol; the catalyst feed rate and ethylene partial pressure remained unchanged at this time. Process dynamics were applied the hexene-to-ethylene ratio and hydrogen-to-ethylene ratio using Formula IV; however, because the time constant and dead times were zero for these variables in this simulation, the resulting dynamic values were equal to the raw values. Process dynamics were also applied to the catalyst feed rate and the ethylene partial pressure; however, because the polymer production rate was lined out and these values had not changed the results were 7.01 kg/hr and 980 kPa respectively. These dynamic values were then applied to the nonlinear algebraic equation of Formula III to provide a resultant estimated production rate of 36.63 t/hr.

Next, values for the Primary and Secondary Controllers were determined. Because the catalyst feed rate dead time was 20 minutes, indicating that any change in catalyst feed rate would not be realized in the actual process for 20 minutes, the Primary Controller was directed 20 minutes into the future. Similarly, the secondary controller was directed 10 minutes into the future. The set of projection values for the measured disturbing variables for butene-to-ethylene molar ratio, hexene-to-ethylene molar ratio, and hydrogen-to-ethylene molar ratio were determined using the projection of measured disturbing variable, as discussed herein. For this simulation, a first order projection equation utilizing a first order projection time constant was used and is represented by Formula V; previously obtained experimental data indicated that a first order projection time constant of 55 minutes for hexene-to-ethylene molar ratio and 95 minutes for hydrogen-to-ethylene molar ratio were appropriately utilized.

$$Proj(t+D) = (Cur(t) - Sp) * e^{-\frac{D}{\tau}} + Sp \qquad \text{Formula V}$$

where
Proj(t+D)
=set of projection values for measured disturbing variables at time D in the future, Cur(t)=Current value of measured disturbing variables at time t;
Sp=Set point of measured disturbing variables going into the future;
D=Time to project into the future (min);
$\tau$=First order projection time constant (min).

Using the projection of measured disturbing variables, at 20 minutes in the future, provided the projected values: hexene-to-ethylene molar ratio=0.185 mol/mol and hydrogen-to-ethylene molar ratio=1.120 mol/mol. Similarly, at 10 minutes in the future, provided projected values were: hexene-to-ethylene molar ratio=0.190 mol/mol and hydrogen-to-ethylene molar ratio=1.112 mol/mol.

Next a difference between the estimated primary control variable value and the actual primary control variable was determined. The estimated polymer production rate of 36.63 t/hr was subtracted from the actual production rate of 36.63 t/hr to determine that the effective value of unmeasured disturbances and modeling error was zero. Then the effective value of unmeasured disturbances and modeling error of zero was subtracted from the polymer production rate set point of 37 t/hr and the resulting value of 37/t/hr was provided to the primary controller and the secondary controller. Because the effective value of unmeasured disturbances and modeling error was zero and the set point was not changed, the primary and secondary controllers set the trajectory equal to the set point at 37 t/hr.

Next, the primary controller utilized the trajectory of 37 t/hr, the projected values (20 minutes into the future) for hexene-to-ethylene molar ratio=0.185 mol/mol, hydrogen-to-ethylene molar ratio=1.120 mol/mol, butene-to-ethylene molar ratio=0.4 mol/mol (which remained constant), the ethylene partial pressure=980 kPa, and inverted the nonlinear algebraic function of Formula III to determine that a catalyst feed rate of 8.24 kg/hr should be utilized to satisfy the process objective, wherein this value is represented as y(t). Then the dynamics from the nonlinear dynamic model are also inverted to determine the final set point to send to the actual process. A lead calculation x(t) is used to invert the dynamics. A lead calculation output can be so noisy as to be unachievable in a real process, so a small first-order decay function $\alpha(t)$ is applied to the function so as to reduce process noise. In this case, the time constant of this alpha decay function is 10.0 minutes, which uses a multiplying factor b=0.2 on the primary manipulated variable time constant, $\tau$.

Using the previously indicated nomenclature, the lead calculation, in the discrete domain, is represented by the following Formulas VI-VII:

$$\alpha_i(t) = \frac{y_i(t) * \Delta t + \alpha_i(t - \Delta t) * b\tau_i}{\Delta t + b\tau_i} \qquad \text{Formula VI}$$

$$x_i(t) = \alpha_i(t) + (\alpha_i(t) - \alpha_i(t - \Delta t)) * \frac{\tau_i}{\Delta t} \qquad \text{Formula VII}$$

For this simulation, the values utilized were:

$$\alpha_i(t) = \frac{8.24 \frac{kg}{h} * 1.0 \text{ min} + 7.0 \frac{kg}{h} * 0.2 * 50.0 \text{ min}}{1.0 \text{ min} + 0.2 * 50.0 \text{ min}} = 7.113 \frac{kg}{h}$$

$$x_i(t) = 7.113 \frac{kg}{h} + \left(7.113 \frac{kg}{h} - 7.0 \frac{kg}{h}\right) * \frac{50.0 \text{ min}}{1.0 \text{ min}} = 12.74 \frac{kg}{h}$$

The model dynamics, using the above equations, were inverted to provide a catalyst feed rate set point of 12.74 kg/hr, which was provided to the actual process.

Similarly, the secondary controller utilized the trajectory of 37 t/hr, projected values (10 minutes into the future) for hexene-to-ethylene molar ratio=0.190 mol/mol, hydrogen-to-ethylene molar ratio=1.112 mol/mol, butene-to-ethylene molar ratio=0.4 mol/mol (which remained constant), catalyst feed rate=7.01 kg/hr, and inverts the nonlinear algebraic function of Formula III to determine that an ethylene partial pressure set point of 1064 kPa should be utilized. Inverting the dynamics resulted in a set point of 1286 kPa. As mentioned, for this simulation it was desired to maintain the ethylene partial pressure within 50 kPa of 980 kPa, so the ethylene partial pressure set point was clamped to 1030 kPa before it was sent to the actual process.

One minute later, at minute 22, the method of controlling a process as described relating to the simulation was applied again, and thereafter again every minute going into the future. The long term result of the method of controlling an actual process, as disclosed herein, is shown in FIG. 4.

Figure 4:
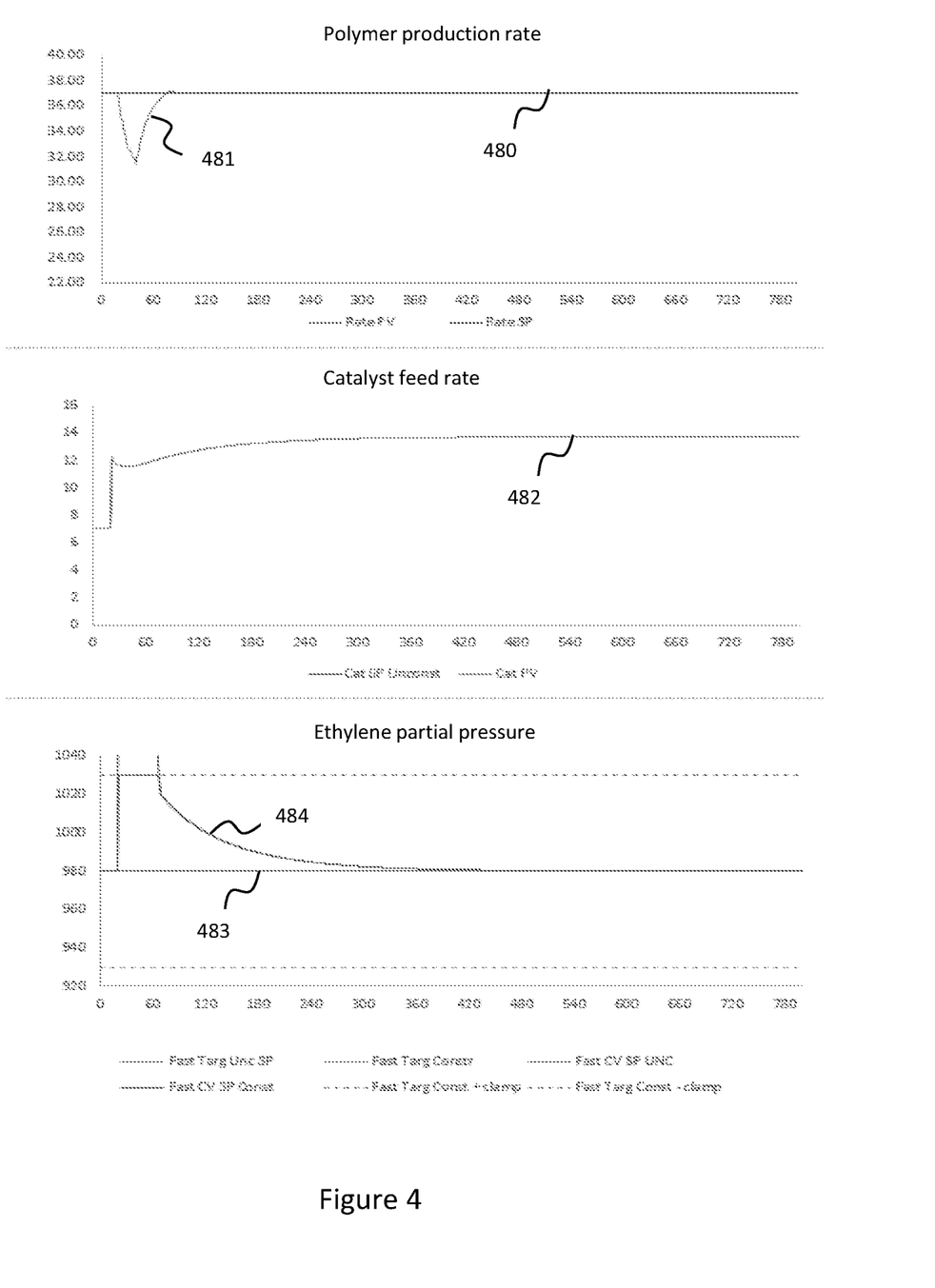
FIG. 4 illustrates polymer production rate, catalyst feed rate, and ethylene partial pressure in accordance with one or more embodiments.

FIG. 4 illustrates polymer production rate, catalyst feed rate, and ethylene partial pressure in accordance with one or more embodiments. Plotted data 480 illustrates the set point for the polymer production rate over time; plotted data 481 illustrates the polymer production rate, i.e. the present value, in relation to the set point. As illustrated in FIG. 4, advantageously the polymer production rate only decreased away from the set point for short time and then quickly returned to the set point.

Plotted data 482 illustrates the catalyst feed rate set point, which in this simulation is also the catalyst feed rate present value. As illustrated in FIG. 4, the catalyst feed rate changed initially in anticipation of the movement of the measured disturbing variables.

Plotted data 483 illustrates the target for the ethylene partial pressure; plotted data 484 illustrates the ethylene partial pressure set point which in this simulation is also the ethylene partial pressure present value. As illustrated in FIG. 4, the ethylene partial pressure moved away from the target to help move the polymer production rate back to the polymer production rate set point; the ethylene partial pressure then shortly returned to the target.

To contrast the coordinated control systems and methods of controlling an actual process disclosed herein, a comparative simulation was performed. The comparative simulation utilized a control methodology as described in U.S. Pat. No. 5,191,521. In contrast the coordinated control systems and methods of controlling an actual process disclosed herein, the comparative simulation does not consider nonlinear dynamic models, measured disturbing variables, or predicting future values. The long-term result of the comparative simulation is shown in FIG. 5.

Figure 5:
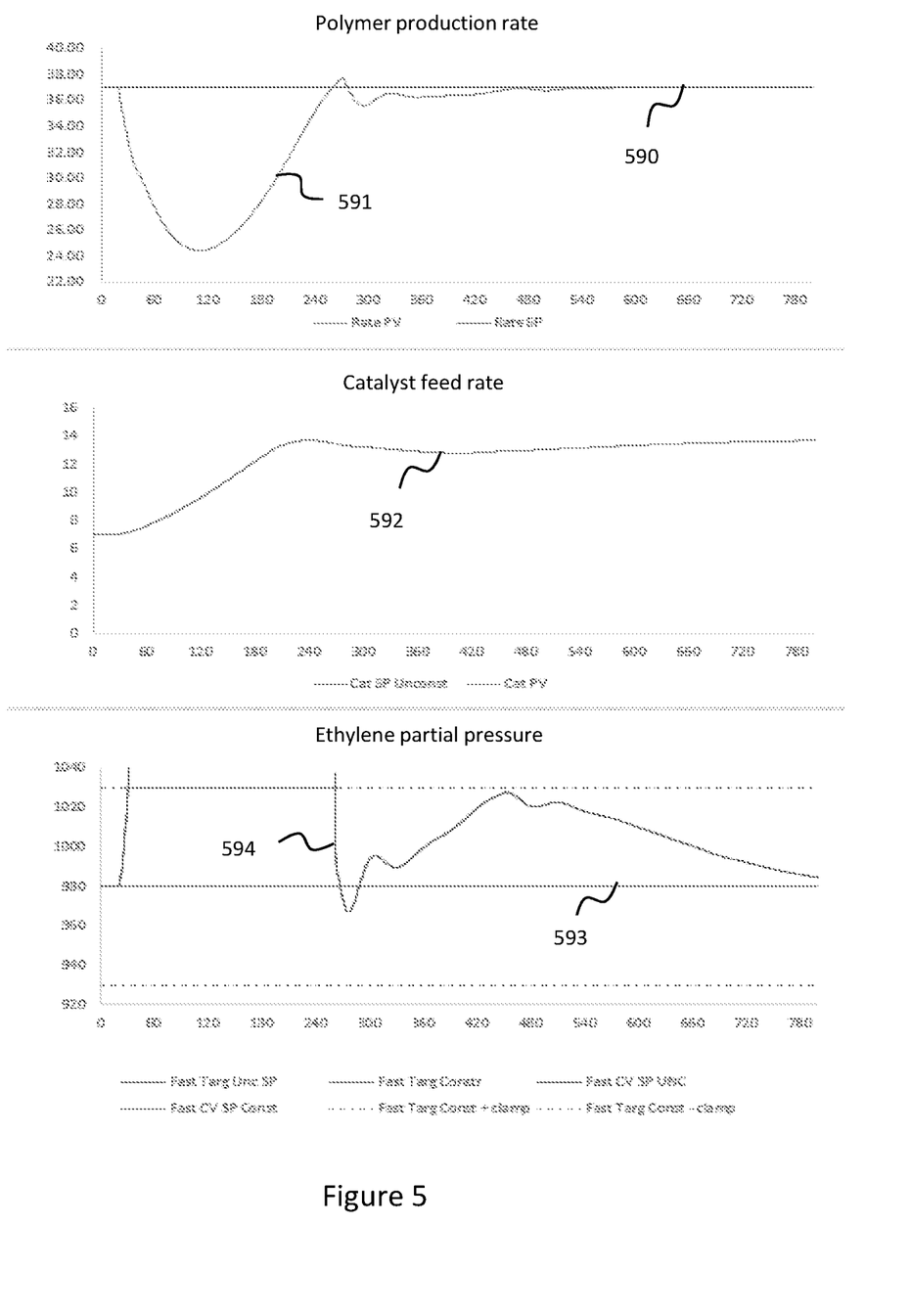
FIG. 5 illustrates polymer production rate, catalyst feed rate, and ethylene partial pressure in accordance with a comparative simulation.

FIG. 5 illustrates polymer production rate, catalyst feed rate, and ethylene partial pressure in accordance with a comparative simulation. Plotted data 590 illustrates the set point for the polymer production rate over time; plotted data 591 illustrates the polymer production rate, i.e. the present value, in relation to the set point. As illustrated in FIG. 5, there was a more pronounced, i.e. both farther away from the set point and away from the set point for a longer period of time, departure from the polymer production rate set point, as compared the plotted data of FIG. 4.

Plotted data 592 illustrates the catalyst feed rate. As illustrated in FIG. 5, the catalyst feed rate took a longer time to change, as compared to the plotted data of FIG. 4. This longer time to change was because the catalyst feed rate of the comparative simulation was responding to the decrease in polymer production rate and comparative simulation does not anticipate the impact of measured disturbing variables.

Plotted data 593 illustrates the target for the ethylene partial pressure; plotted data 594 illustrates the ethylene partial pressure set point which in this simulation is also the ethylene partial pressure present value. As illustrated in FIG. 5, the ethylene partial pressure moved away from the target and took a longer time to return to the target, as compared the plotted data of FIG. 4.

Figure 6:
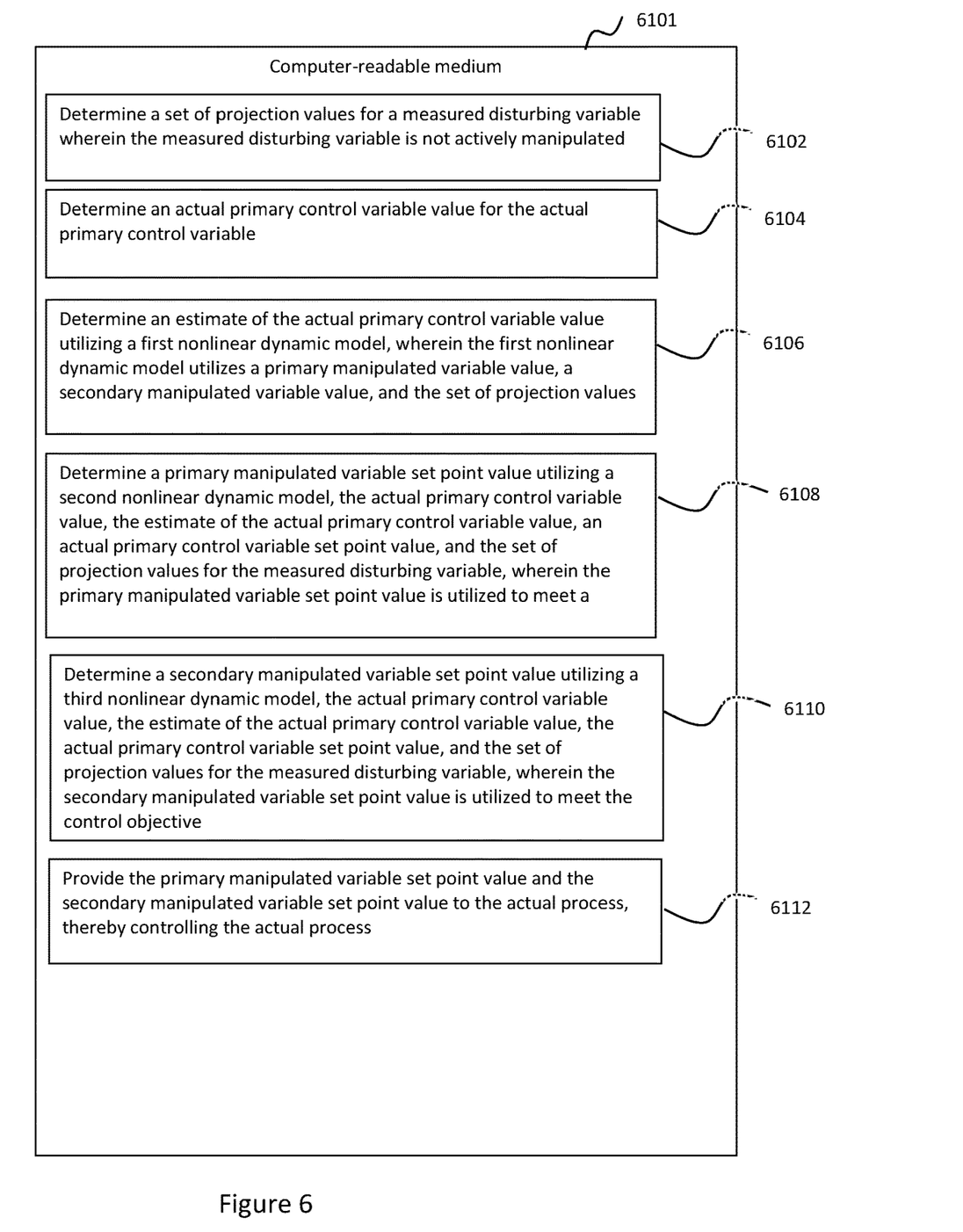
FIG. 6 is a block diagram of an example of a computer-readable storage medium in accordance with one or more embodiments.

FIG. 6 is a block diagram of an example of a computer-readable storage medium 6101 in accordance with one or more embodiments. As an example, the coordinated control system 102 may comprise the non-transitory computer-readable medium 6101 storing instructions executable by a processing resource to implement methods of controlling an actual process, as disclosed herein.

In various examples, the computer-readable storage medium 6101 can include instructions 6102, when executed by a processing resource, that can determine a set of projection values for a measured disturbing variable wherein the measured disturbing variable is not actively manipulated to influence an actual primary control variable; 6104 determine an actual primary control variable value for the actual primary control variable; 6106 determine an estimate of the actual primary control variable value utilizing a first nonlinear dynamic model, wherein the first nonlinear dynamic model utilizes a primary manipulated variable value, a secondary manipulated variable value, and the set of projection values for the measured disturbing variable; 6108 determine a primary manipulated variable set point value utilizing a second nonlinear dynamic model, the actual primary control variable value, the estimate of the actual primary control variable value, an actual primary control variable set point value, and the set of projection values for the measured disturbing variable, wherein the primary manipulated variable set point value is utilized to meet a control objective; 6110 determine a secondary manipulated variable set point value utilizing a third nonlinear dynamic model, the actual primary control variable value, the estimate of the actual primary control variable value, the actual primary control variable set point value, and the set of projection values for the measured disturbing variable, wherein the secondary manipulated variable set point value is utilized to meet the control objective; and 6112 provide the primary manipulated variable set point value and the secondary manipulated variable set point value to the actual process, thereby controlling the actual process.

The computer-readable storage medium 6101 can utilize a number of nonlinear dynamic models, such as nonlinear dynamic model 150A, nonlinear dynamic model 150B, and nonlinear dynamic model 150C, as previously discussed herein. With respect to the executable instruction representations or boxes described and shown herein, it should be understood that part or all of the executable instructions and/or electronic circuits included within one box can be included in a different box shown in the figures or in a different box not shown. The computer-readable storage medium 6101 can include a number of additional instructions, e.g., associated with the method of controlling an actual process as disclosed herein, that are not illustrated in FIG. 6.

Although an individual processing resource and an individual computer-readable storage medium is referred to, the descriptions can also apply to a coordinated control system 102 with multiple processing resources and multiple computer-readable storage mediums. In such examples, the instructions can be distributed across multiple computer-readable storage mediums and the instructions can be distributed across multiple processing resources. Put another way, the instructions can be stored across multiple computer-readable storage mediums and executed across multiple processing resources, such as in a distributed computing environment. One or more embodiments provide that the coordinated control system 102 may include logic, e.g., to perform one or more of the steps discussed herein.

The computer-readable storage medium can be any electronic, magnetic, optical, or other physical storage device that stores executable instructions. Thus, the computer-readable storage medium can be, for example, Random Access Memory (RAM), an Electrically-Erasable Programmable Read-Only Memory (EEPROM), a storage drive, an optical disc, and the like. The executable instructions can be "installed" on the coordinated control system 102. The computer-readable storage medium can be a portable, external or remote storage medium, for example, that allows the coordinated control system 102 to download the instructions from the portable/external/remote storage medium.

The processing resource can be a central processing unit (CPU), microprocessor, and/or other hardware device suitable for retrieval and execution of instructions stored in computer-readable storage medium. As an example, the processing resource can receive, determine, and send information. As an alternative or in addition to retrieving and executing instructions, the processing resource can include an electronic circuit comprising an electronic component for performing the operations of the instructions in computer-readable storage medium.

The coordinated control system 102, e.g., components thereof, may include the appropriate components, e.g., hardware and/or software, to interface with the various process equipment, such as process equipment associated with the actual process, to facilitate measurements, and to perform calculations, and so on. A variety of instrumentation known to those of ordinary skill in the art may be utilized.

The coordinated control systems and/or methods of controlling an actual process disclosed herein may be utilized for a number of applications, such as, a chemical process, an olefin process, a polymerization process, and a gas phase polymerization process, among others. Various processes may utilize a single reactor configuration, a dual reactor configuration, a titanium catalyst system, or a chromium catalyst system including a metallocene, for example.

What is claimed is:

1. A method of controlling an actual process, the actual process being a gas phase polymerization process, the method comprising:
   determining a set of projection values for a measured disturbing variable wherein the measured disturbing variable is an uncontrolled variable and is not actively manipulated to influence an actual primary control variable;
   determining an actual primary control variable value for the actual primary control variable;
   determining an estimate of the actual primary control variable value utilizing a first nonlinear dynamic model, wherein the first nonlinear dynamic model utilizes a primary manipulated variable value, a secondary manipulated variable value, and the set of projection values for the measured disturbing variable;
   determining a primary manipulated variable set point value by utilizing a second nonlinear dynamic model, wherein the second nonlinear dynamic model utilizes the actual primary control variable value, the estimate of the actual primary control variable value, an actual primary control variable set point value, and the set of projection values for the measured disturbing variable, wherein the primary manipulated variable set point value is provided to the actual process, wherein a first comparator compares the actual primary control variable value to the actual primary control variable set point value to provide a desired value for the actual primary control variable, wherein the desired value for the actual primary control variable, the estimate of the actual primary control variable value, and the set of projection values for the measured disturbing variable are inputs for the second nonlinear dynamic model;
   determining a secondary manipulated variable set point value by utilizing a third nonlinear dynamic model, wherein the third nonlinear dynamic model utilizes the actual primary control variable value, the estimate of the actual primary control variable value, the actual primary control variable set point value, and the set of projection values for the measured disturbing variable, wherein the secondary manipulated variable set point value is provided to the actual process, wherein a first comparator compares the actual primary control variable value to the actual primary control variable set point value to provide a desired value for the actual primary control variable, wherein the desired value for the actual primary control variable, the estimate of the actual primary control variable value, and the set of projection values for the measured disturbing variable are inputs for the third nonlinear dynamic model; and
   providing the primary manipulated variable set point value and the secondary manipulated variable set point value to the actual process, wherein the set of projection values includes values for future times which are beyond a current time by a dead time of the primary manipulated variable.

2. The method of claim 1 wherein a primary controller and a secondary controller coordinately control the primary manipulated variable and the secondary manipulated variable.

3. The method of claim 1 wherein the primary manipulated variable has a greater lag response than the secondary manipulated variable.

4. The method of claim 1 wherein the primary manipulated variable has a greater dead time than the secondary manipulated variable.

5. The method of claim 1 wherein the first nonlinear dynamic model, the second nonlinear dynamic model, and the third nonlinear dynamic model are the same model.

6. The method of claim 1 wherein the first nonlinear dynamic model, the second nonlinear dynamic model, and the third nonlinear dynamic model are independently selected from a same model, a different model, or a combination thereof.

7. A non-transitory computer-readable medium storing instructions executable by a processing resource to:
   determine a set of projection values for a measured disturbing variable wherein the measured disturbing variable is an uncontrolled variable and is not actively manipulated to influence an actual primary control variable;
   determine an actual primary control variable value for the actual primary control variable;
   determine an estimate of the actual primary control variable value utilizing a first nonlinear dynamic model, wherein the first nonlinear dynamic model utilizes a primary manipulated variable value, a secondary manipulated variable value, and the set of projection values for the measured disturbing variable;

determine a primary manipulated variable set point value by utilizing a second nonlinear dynamic model, the actual primary control variable value, the estimate of the actual primary control variable value, an actual primary control variable set point value, and the set of projection values for the measured disturbing variable, wherein the primary manipulated variable set point value is provided to an actual process, wherein a first comparator compares the actual primary control variable value to the actual primary control variable set point value to provide a desired value for the actual primary control variable, wherein the desired value for the actual primary control variable, the estimate of the actual primary control variable value, and the set of projection values for the measured disturbing variable are inputs for the second nonlinear dynamic model;

determine a secondary manipulated variable set point value by utilizing a third nonlinear dynamic model, the actual primary control variable value, the estimate of the actual primary control variable value, the actual primary control variable set point value, and the set of projection values for the measured disturbing variable, wherein the secondary manipulated variable set point value is provided to the actual process, wherein a first comparator compares the actual primary control variable value to the actual primary control variable set point value to provide a desired value for the actual primary control variable, wherein the desired value for the actual primary control variable, the estimate of the actual primary control variable value, and the set of projection values for the measured disturbing variable are inputs for the third nonlinear dynamic model; and provide the primary manipulated variable set point value and the secondary manipulated variable set point value to the actual process, wherein the actual process is a gas phase polymerization process.

8. A coordinated control system comprising:

an actual process associated with an actual primary control variable, wherein the actual process is a gas phase polymerization process;

a primary controller that controls a primary manipulated variable that influences the actual primary control variable, wherein the primary controller provides a primary manipulated variable set point value to the actual process;

a secondary controller that controls a secondary manipulated variable that influences the actual primary control variable, wherein the secondary controller provides a secondary manipulated variable set point value to the actual process;

an estimate of process that utilizes a nonlinear dynamic model to determine an estimated primary control variable value, wherein the nonlinear dynamic model utilizes the primary manipulated variable value, the secondary manipulated variable value, and a measured disturbing variable value, wherein the measured disturbing variable is an uncontrolled variable; and a projection of the measured disturbing variable that provides a set of projection values for the measured disturbing variable to the primary controller and the secondary controller, wherein:

the primary controller determines a primary manipulated variable set point value by utilizing a second nonlinear dynamic model, the actual primary control variable value, the estimate of the actual primary control variable value, an actual primary control variable set point value, and the set of projection values for the measured disturbing variable, wherein the primary manipulated variable set point value is provided to the actual process, wherein a first comparator compares the actual primary control variable value to the actual primary control variable set point value to provide a desired value for the actual primary control variable, wherein the desired value for the actual primary control variable, the estimate of the actual primary control variable value, and the set of projection values for the measured disturbing variable are inputs for the second nonlinear dynamic model;

the primary manipulated variable set point value is utilized to meet the control objective; and the secondary controller determines a secondary manipulated variable set point value by utilizing a third nonlinear dynamic model, the actual primary control variable value, the estimate of the actual primary control variable value, the actual primary control variable set point value, and the set of projection values for the measured disturbing variable, wherein the secondary manipulated variable set point value is provided to the actual process, wherein a first comparator compares the actual primary control variable value to the actual primary control variable set point value to provide a desired value for the actual primary control variable, wherein the desired value for the actual primary control variable, the estimate of the actual primary control variable value, and the set of projection values for the measured disturbing variable are inputs for the third nonlinear dynamic model.

* * * * *